(12) United States Patent
Hayashi

(10) Patent No.: US 9,193,074 B2
(45) Date of Patent: Nov. 24, 2015

(54) MULTI-JOINT ROBOT HAVING GAS SPRING, AND METHOD FOR ESTIMATING INNER PRESSURE OF THE GAS SPRING

(71) Applicant: FANUC CORPORATION, Yamanashi (JP)

(72) Inventor: Yu Hayashi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 14/228,560

(22) Filed: Mar. 28, 2014

(65) Prior Publication Data

US 2014/0297037 A1   Oct. 2, 2014

(30) Foreign Application Priority Data

Mar. 29, 2013 (JP) ................... 2013-072507

(51) Int. Cl.
  *B25J 9/16*   (2006.01)
  *B25J 13/00*   (2006.01)

(52) U.S. Cl.
  CPC .............. *B25J 9/1694* (2013.01); *B25J 9/1653* (2013.01); *B25J 13/00* (2013.01)

(58) Field of Classification Search
  CPC ......... B25J 9/1653; B25J 9/1694; B25J 13/00
  See application file for complete search history.

(56) References Cited

U.S. PATENT DOCUMENTS

| 6,408,225 B1* | 6/2002 | Ortmeier et al. ............... 700/254 |
| 2010/0212305 A1* | 8/2010 | Runesson et al. ............... 60/327 |
| 2011/0072930 A1 | 3/2011 | Bayer et al. |
| 2012/0065781 A1* | 3/2012 | Ikeda et al. ................... 700/261 |

FOREIGN PATENT DOCUMENTS

| CA | 2217224 A1 | 10/1996 |
| DE | 29506008 U1 | 9/1996 |
| DE | 19837595 A1 | 3/2000 |
| DE | 102009043405 B3 | 4/2011 |
| JP | S61109679 A | 5/1986 |
| JP | S63180491 A | 7/1988 |
| JP | 06031680 A | 2/1994 |
| JP | 10044084 A | 2/1998 |
| JP | 10138189 A | 5/1998 |
| JP | 11048185 A | 2/1999 |
| JP | 2007298513 A | 11/2007 |
| JP | 2009270987 A | 11/2009 |
| JP | 2012061535 A | 3/2012 |
| JP | 2012519083 A | 8/2012 |

* cited by examiner

*Primary Examiner* — Khoi Tran
*Assistant Examiner* — Adam Mott
(74) *Attorney, Agent, or Firm* — Fredrikson & Byron, P.A.

(57) ABSTRACT

A multi-joint robot having a function for estimating an amount of decrease in inner pressure of a gas spring, by means of a simple and low-cost structure, and a method for estimating the amount of decrease in inner pressure of the gas spring. The gas pressure within a cylinder of the gas spring decreases in connection with the motion of a lower arm associated with the gas spring. In the present invention, an amount of decrease in inner pressure within the gas spring is estimated by using a current value of a servomotor, in view of the finding that the amount of decrease in inner pressure is generally proportional to an amount of decrease in torque, and the torque generated by the servomotor can be calculated based on the current value of the servomotor.

6 Claims, 3 Drawing Sheets

MULTI-JOINT ROBOT HAVING GAS SPRING, AND METHOD FOR ESTIMATING INNER PRESSURE OF THE GAS SPRING

BACKGROUND OF THE INVENTION

1. Field of the Invention

The preset invention relates to a multi-joint robot having a gas spring, and in particular, relates to a technique for estimating the amount of decrease in the inner pressure of the gas spring.

2. Description of the Related Art

A gas spring has a piston structure in which a compressible inert gas (hereinafter merely referred to as "gas") is enclosed, and is capable of generating reactive force by compressing the gas due to the motion of a piston rod relative to a cylinder. Generally, such a gas spring is small and lightweight in comparison to a coil spring having the same degree of output as the gas spring, and thus the gas spring is useful for reducing the size and weight of an entire system.

In a multi-joint robot having a gravitative axis, as an apparatus for supplementing the power (or torque) of a servomotor for driving the axis, an apparatus (hereinafter referred to as a balancer), capable of generating a force in a direction opposite to the direction of a load due to gravity, may be utilized. When the gas spring is applied to the balancer (such a balancer is referred to as a gas balancer), since the output of the gas spring is relatively high in spite of its size and weight, the gas spring can generate relatively high auxiliary torque with a compact mechanism. Therefore, by virtue of the gas spring, a compact and lightweight robot capable of conveying a relatively heavy load may be constituted.

For example, JP H10-138189 A discloses a balancer for reducing the load moment of a vertical rotation axis 2 which drives a rotating arm 3 on a base 1. The balancer has a cylinder 4, a rod 5 and a piston 6, wherein an air-compressing chamber 10 is connected to cylinder 4 via a communication part 11, and gas such as air (compressible fluid) and viscous liquid such as oil are enclosed in cylinder 4 and chamber 10.

On the other hand, in the gas spring, it is known that gas enclosed in the cylinder may leak to the outside the cylinder due to the motion of the piston rod relative to the cylinder, whereby the inner pressure of the cylinder gradually decreases. Therefore, the force generated by the balancer is lowered, resulting in an alarm informing of a lack of torque being output, thereby causing a robot to be brought to an emergency stop.

As means for avoiding such a problem due to a reduction of the inner pressure of the cylinder, several techniques have been proposed. For example, JP 2007-298513 A discloses a circuit pressure display device capable of displaying the reduction of inner pressure of a gas spring circuit. JP 2009-270987 A discloses a pressure indicator for a gas spring, configured to indicate the pressure of compressible gas contained in a gas filling chamber of the gas spring.

Further, JP 2012-519083 A discloses a balancing device including a gas spring 4 and a compression system 5. Compression system 5 has a compressor 6 and an automatic control system 7 for adjusting the pressure within gas spring 4, wherein automatic control system 7 controls a pressure control valve 9 for limiting the flow rate of gas from or to gas spring 4, based on a signal from a pressure sensor 8 for detecting the pressure in gas spring 4.

As described in JP 2007-298513 A or JP 2009-270987 A, when the pressure indicator is attached to the outside of the gas spring, the cost of equipment is increased, based on the cost of the pressure indicator. It is necessary to arrange a connecting means such as a connector between the pressure indicator and the gas spring. However, use of the connecting means increases the possibility of gas leakage. Further, gas leakage may occur due to breakage of the pressure indicator.

As described in JP 2012-519083 A, when the pressure sensor and the pressure control valve are arranged in the gas spring, the cost of equipment is increased, based at least on the cost of the sensor and the valve, and the possibility of gas leakage increases, similarly to JP 2007-298513 A or JP 2009-270987 A. Further, since a device such as a gas tank 11 connected to pressure control valve 9 is necessary, peripheral equipment may become larger in size.

SUMMARY OF THE INVENTION

Therefore, an object of the present invention is to provide a multi-joint robot comprising: a robot mechanical unit having at least one arm; a gas spring arranged on the arm; and a controller which controls the robot mechanical unit, wherein the gas spring comprises a cylinder, compressible inert gas enclosed within the cylinder and a piston rod configured to slide in the cylinder, the gas spring being configured as a gas balancer for reducing a load of a servomotor which drives the arm, and wherein the controller has a function to obtain a reference current value of a servomotor for driving the arm at a reference point in time when the servomotor is energized and controlled; obtain an object current value of the servomotor at a point in time, which is different from the reference point in time, when the servomotor is energized and controlled under the same operating condition as the reference point in time; calculate a difference between the reference current value and the object current value; and calculate an amount of decrease in inner pressure of the compressible inert gas of the gas spring, based on the difference.

In a preferred embodiment, a current commanded value for the servomotor is used as the reference current value and the object current value.

In a preferred embodiment, the controller has storing means configured to store an operating condition of the multi-joint robot when the reference current value is obtained.

In a preferred embodiment, the robot comprises means configured to visually or aurally output the amount of decrease in the inner pressure of the compressible inert gas.

In a preferred embodiment, the means displays a temporal change in the amount of decrease in inner pressure.

According to another aspect of the present invention, a method for estimating an amount of decrease in inner pressure of a gas spring of a multi-joint robot is provided, the multi-joint robot comprising: a robot mechanical unit having at least one arm; a gas spring arranged on the arm; and a controller which controls the robot mechanical unit, wherein the gas spring comprises a cylinder, compressible inert gas enclosed within the cylinder and a piston rod configured to slide in the cylinder, the gas spring being configured as a gas balancer for reducing a load of a servomotor which drives the arm, and wherein the method comprises the steps of: obtaining a reference current value of the servomotor at a reference point in time when the servomotor is energized and controlled; obtaining an object current value of the servomotor at a point in time, which is different from the reference point in time, when the servomotor is energized and controlled under the same operating condition as the reference point in time; calculating a difference between the reference current value and the object current value; and calculating an amount of decrease in the inner pressure of the compressible inert gas of the gas spring, based on the difference.

BRIEF DESCRIPTION OF THE DRAWINGS

The above and other objects, features and advantages of the present invention will become more apparent from the following description of the preferred embodiments thereof, with reference to the accompanying drawings, wherein.

DETAILED DESCRIPTIONS

Figure 1:
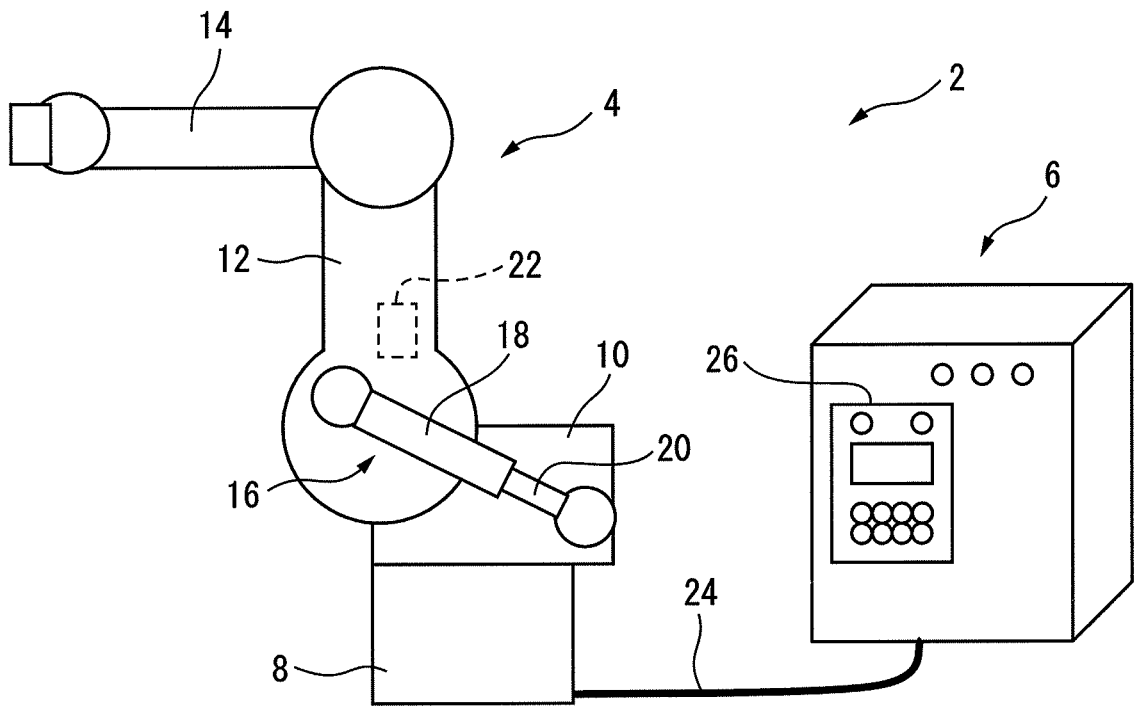
FIG. 1 shows a schematic configuration of a multi-joint robot according to a preferred embodiment of the present invention.

FIG. 1 shows a schematic configuration of a multi-joint robot according to a preferred embodiment of the present invention. Multi-joint robot 2 includes a robot mechanical unit 4 having at least one arm 12, a controller 6 which controls robot mechanical unit 4, and a gas spring arranged on the at least one arm. In the illustrated embodiment, robot mechanical unit 4 has a base 8, a rotating body 10 rotatably attached to base 8, a lower arm 12 rotatably attached to rotating body 10, and an upper arm 14 rotatably attached to lower arm 12. Multi-joint robot 2 further has a gas spring 16 associated with lower arm 12. Gas spring 16 has a cylinder 18 rotatably attached to lower arm 12, and a piston rod 20 rotatably attached to rotating body 10, wherein piston rod 20 is configured to slide in cylinder 18. In cylinder 18, compressible inert gas is enclosed. Gas spring 16 is used as a gas balancer for reducing the load of a servomotor 22 which drives lower arm 12 to which a gravity load is applied.

Controller 6 is connected to robot mechanical unit 4 via a power feeding cable, etc., so as to control the motion of each axis of robot mechanical unit 4 and execute a process for estimating inner gas pressure as described below. Controller 6 may have an operation panel 26 with a monitor, on which an estimated inner pressure, etc. is displayed.

Figure 2:
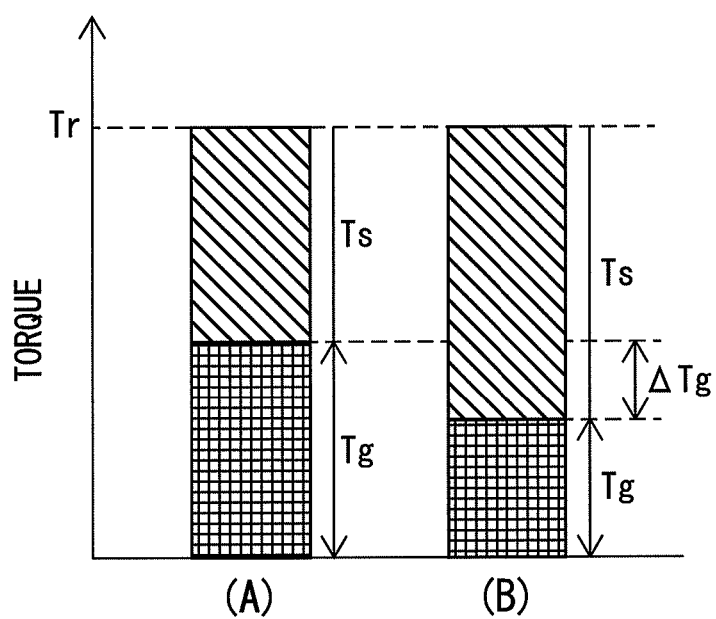
FIG. 2 is a graph explaining a change in torque of a servomotor due to a decrease in the inner pressure of a gas spring.

FIG. 2 is a view explaining the amount of torque necessary to control the displacement and velocity of lower arm 12 under a predetermined condition. In more detail, a graph (A) indicates a state wherein an appropriate amount of gas is filled within the gas spring, and a graph (B) indicates a state wherein the gas pressure is lowered, due a certain amount of gas in the gas spring leaking out. Since gas spring 16 is used as the gas balancer as described above, torque Tr necessary to drive lower arm 12 corresponds to the sum of torque Ts obtained by servomotor 22 and torque Tg obtained by gas spring 16. As should be apparent from a comparison of the two graphs, torque Tg of gas spring 16 is lowered due to leakage of the gas. Therefore, in order to obtain torque Tr, it is necessary to increase torque Ts of servomotor 22.

The amount of decrease in the inner pressure of gas spring 16 bears a generally proportionate or linear relationship to the amount of decrease in torque Tg ($\Delta$Tg), and torque Ts generated by servomotor 22 can be calculated based on the current value of servomotor 22 (i.e., the torque bears a generally proportionate or linear relationship to the current value). Therefore, in the present invention, the amount of decrease in the gas pressure is estimated (calculated) using the current value of servomotor 22. In the example of FIG. 2, the amount of decrease in the gas pressure in graph (B) can be calculated based on a difference between detected current values of servomotor 22 in graphs (A) and (B).

Figure 3:
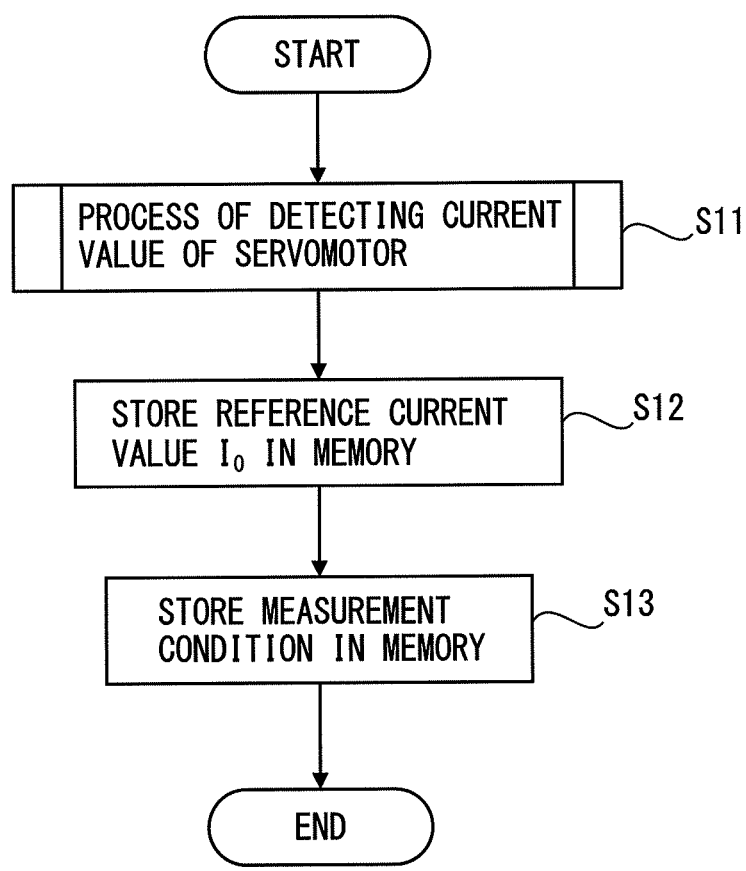
FIG. 3 is a flowchart explaining a procedure including a process for detecting a reference current value of the servomotor.

Next, a procedure for estimating the amount of decrease in the gas pressure of gas spring 16 in the invention is explained. First, as shown in FIG. 3, the current value of servomotor 22 at a reference point in time is detected and stored. In this regard, the "reference point in time" means a state wherein an appropriate amount of gas is enclosed within the gas spring and the gas spring can output a predetermined (desired) torque as the gas balancer (for example, corresponding to graph (A) in FIG. 2). At the reference point in time, when a command for obtaining a reference current value is output, the current value of servomotor 22 is detected while the servomotor is energized and controlled (step S11), and the detected current value is stored as a reference current value $I_0$ in a storing means such as a memory (step S12). As a means for detecting reference current value $I_0$, a feedback circuit used to control servomotor 22 may be used, and a feedback value obtained by the feedback circuit may be used as detected reference current value $I_0$. In addition, an operating condition of multi-joint robot 2 (the posture and/or motion velocity of the robot, etc.) when reference current value $I_0$ is detected may also be stored in the memory (step S13). By storing the operating condition when the reference current value is detected, an object current value as described below can be precisely detected under the same operating condition as when the reference current value is detected, even after a long period of time has elapsed.

Figure 4:
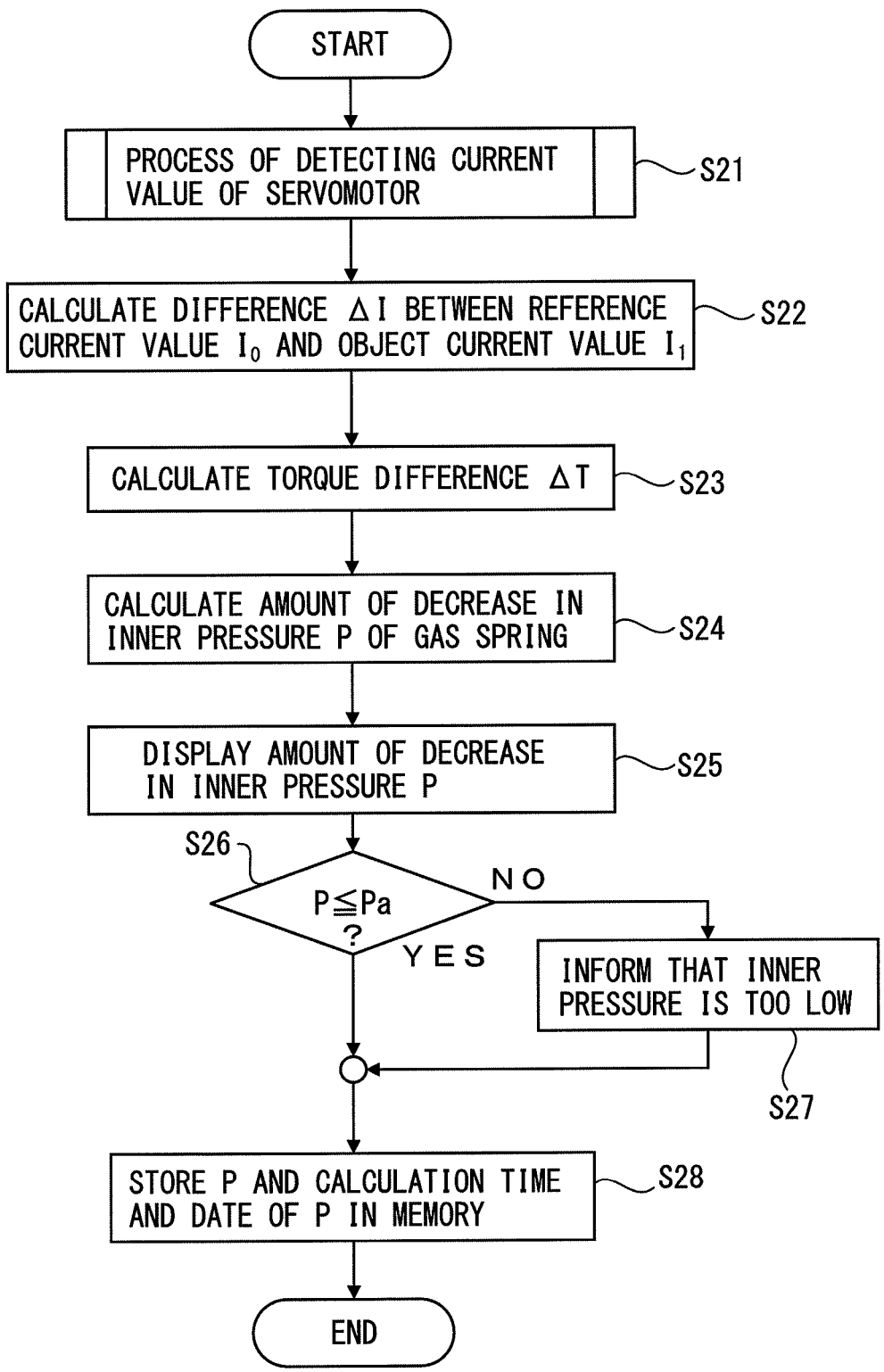
FIG. 4 is a flowchart explaining a procedure including a process for detecting an object current value of the servomotor.

FIG. 4 is a flowchart explaining a procedure for calculating the amount of decrease in inner pressure of gas spring 16. First, at a point in time (for example, when the robot is actually operated) different from the reference point in time, when a command for obtaining an object current value is output under the same operating condition as when the reference current value is detected, an object current value $I_1$ is detected while servomotor 22 is energized and controlled (step S21). Then, a difference current value $\Delta I$, which corresponds to a difference between detected object current value $I_1$ and stored reference current value $I_0$, is calculated (step S22). In this regard, it may be difficult to fully equalize the actual operating condition to that at the reference point in time. Therefore, the operating conditions may be determined as "the same," when a difference between the operating conditions is within a predetermined range, wherein it is experimentally known that the difference within the range does not affect the detected value.

Next, based on difference current value $\Delta I$, a difference in torque generated by servomotor 22 relative to the reference point in time (corresponding to torque $\Delta$Tg in the example of FIG. 2) is calculated so as to obtain a torque difference $\Delta T$ (or an amount of increase in torque) (step S23). Further, based on obtained torque difference $\Delta T$, the amount of decrease in the inner pressure P of gas spring 16 is calculated (step S24). In this regard, torque difference $\Delta T$ can be calculated based on difference current value $\Delta I$ (i.e., by multiplying $\Delta I$ by an appropriate conversion factor), since they are proportional to each other. Similarly, the amount of decrease in gas pressure can be calculated based on torque difference $\Delta T$ (i.e., by multiplying $\Delta T$ by an appropriate conversion factor), since they are proportional to each other. In addition, calculation of the torque difference (step S23) may be omitted, and the amount of decrease in gas pressure P may be calculated based on difference current value $\Delta I$.

In the next step S25, the amount of decrease in inner pressure P calculated in step S24 is displayed on display means such as operation panel 26 with a monitor of controller 6. Then, the calculated amount of decrease in inner pressure P is compared to a predetermined permitted value Pa (step S26). When the amount of decrease P exceeds permitted value Pa, a visual output (e.g., a message "the gas inner pressure is too low" displayed on operation panel 26) and/or an aural output (such as an alarm) is generated (step S27). By virtue of this, even when the robot is located in a corner or recess, the operator can be quickly and visually or aurally informed that the amount of decrease in gas pressure exceeds the permitted value. Finally, the time and date on which these procedures are carried out are associated with the calculated amount of decrease in inner pressure, and the result is stored in a memory, etc. (step S28).

In addition to the procedure as shown in FIG. 4, a process for displaying a temporal change of the amount of inner pressure P may be executed. Further, the calculated amount of decrease in inner pressure may be used for a process for detecting and judging a state of the robot mechanism such as time degradation, etc. For example, a maintenance operator of the robot can predict the degree of decrease in gas pressure, and can take appropriate measures by determining in advance as to when the gas should be refilled.

Although both reference current value $I_0$ and object current value $I_1$ are obtained by the detection (or measurement) in the above embodiment, current commanded values may be used as the above values. For example, when a command for obtaining the reference current value and a command for obtaining the object current value are output, the corresponding current commanded values used to control servomotor 22 may be determined as reference current value $I_0$ and object current value $I_1$, respectively. Also in this case, there is provided an effect similar to the case wherein the current actually flowing in the servomotor is detected.

While the preferred embodiment of the present invention is explained above, the present invention is not limited to the embodiment. For example, although the gas spring explained with reference to FIG. 1 assists servomotor 22 of lower arm 12 which pivots in the back-and-forth direction (or the horizontal direction), a gas spring of a robot configured to support a driven axis to which the gravity is applied may have the same function and effect as described above. In other words, the present invention may be applied to lower arm 12 when the lower arm pivots in the vertical or oblique direction, and may also be applied to an arm other than the lower arm. Further, although the axis (or lower arm 12) is displaced in the above embodiment, the present invention can be applied to either when the axis is displaced or when the axis remains stationary, as long as the servomotor is energized and controlled.

According to the present invention, the amount of decrease in the inner pressure of the gas spring can be estimated based on the difference current value which is calculated from the reference current value and the object current value, wherein the operating conditions (such as the orientation and/or velocity of the robot) regarding the reference current value and the object current value are the same. Therefore, the amount of decrease can be precisely estimated without using means such as a pressure gauge, while the effect of a load condition or operating condition of the robot can be eliminated.

By using the current commanded value as the reference current value and the object current value, there is provided an effect similar to the case wherein the current actually flowing in the servomotor is detected.

By storing the operating condition when detecting the current value in the robot controller, the object current value can be precisely detected under the same operating condition as when the reference current value is detected, even after a long period of time has elapsed.

By visually or aurally outputting the amount of decrease in inner pressure and/or the temporal change thereof, the operator can predict the degree of decrease in gas pressure, and can take necessary measures before the robot can no longer carry out a predetermined operation.

While the invention has been described with reference to specific embodiments chosen for the purpose of illustration, it should be apparent that numerous modifications can be made thereto, by one skilled in the art, without departing from the basic concept and scope of the invention.

The invention claimed is:

1. A multi-joint robot comprising:
   a robot mechanical unit having at least one arm;
   a gas spring arranged on the arm; and
   a controller which controls the robot mechanical unit,
   wherein the gas spring comprises a cylinder, compressible inert gas enclosed within the cylinder and a piston rod configured to slide in the cylinder, the gas spring being configured as a gas balancer for reducing a load of a servomotor which drives the arm, and
   wherein the controller has a function to obtain a reference current value of a servomotor for driving the arm at a reference point in time when the servomotor is energized and controlled; obtain an object current value of the servomotor at a point in time, which is different from the reference point in time, when the servomotor is energized and controlled under the same operating condition as the reference point in time; calculate a difference between the reference current value and the object current value; and calculate an amount of decrease in inner pressure of the compressible inert gas of the gas spring, based on the difference.

2. The multi-joint robot as set forth in claim 1, wherein a current commanded value for the servomotor is used as the reference current value and the object current value.

3. The multi-joint robot as set forth in claim 1, wherein the controller has storing means configured to store an operating condition of the multi-joint robot when the reference current value is obtained.

4. The multi-joint robot as set forth in claim 1, wherein the robot comprises means configured to visually or aurally output the amount of decrease in inner pressure of the compressible inert gas.

5. The multi-joint robot as set forth in claim 4, wherein the means displays a temporal change in the amount of decrease in inner pressure.

6. A method for estimating an amount of decrease in inner pressure of a gas spring of a multi-joint robot, the multi-joint robot comprising:
   a robot mechanical unit having at least one arm;
   a gas spring arranged on the arm; and
   a controller which controls the robot mechanical unit,
   wherein the gas spring comprises a cylinder, compressible inert gas enclosed within the cylinder and a piston rod configured to slide in the cylinder, the gas spring being configured as a gas balancer for reducing a load of a servomotor which drives the arm, and
   wherein the method comprises the steps of:
   obtaining a reference current value of the servomotor at a reference point in time when the servomotor is energized and controlled;

obtaining an object current value of the servomotor at a point in time, which is different from the reference point in time, when the servomotor is energized and controlled under the same operating condition as the reference point in time;

calculating a difference between the reference current value and the object current value; and calculating an amount of decrease in the inner pressure of the compressible inert gas of the gas spring, based on the difference.

* * * * *